US011321470B1

(12) United States Patent
Dozer et al.

(10) Patent No.: US 11,321,470 B1
(45) Date of Patent: *May 3, 2022

(54) INTEGRATED OUT-OF-BAND SECURITY FOR HIGH SECURITY EMBEDDED SYSTEMS

(71) Applicant: Riverside Research Institute, New York, NY (US)

(72) Inventors: David Dozer, Springboro, OH (US); Adam Kouse, Beavercreek, OH (US)

(73) Assignee: Riverside Research Institute, New York, NY (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/804,183

(22) Filed: Feb. 28, 2020

Related U.S. Application Data

(62) Division of application No. 15/705,812, filed on Sep. 15, 2017, now Pat. No. 10,614,231.

(60) Provisional application No. 62/395,043, filed on Sep. 15, 2016.

(51) Int. Cl.
*G06F 21/60* (2013.01)
*G06F 12/14* (2006.01)
*G06F 21/52* (2013.01)

(52) U.S. Cl.
CPC ........ *G06F 21/602* (2013.01); *G06F 12/1408* (2013.01); *G06F 21/52* (2013.01); *G06F 2211/007* (2013.01); *G06F 2212/1052* (2013.01)

(58) Field of Classification Search
CPC .... G06F 21/602; G06F 12/1408; G06F 21/52; G06F 2212/1052; G06F 2211/007
See application file for complete search history.

(56) References Cited

U.S. PATENT DOCUMENTS 6,173,419 B1 * 1/2001 Barnett ................. G06F 11/261
714/28
7,701,252 B1 * 4/2010 Chow ................. H01L 25/0657
326/41
9,761,564 B1 * 9/2017 Shibata ............... H01L 25/0657
(Continued)

OTHER PUBLICATIONS

Karp et al., "Interposer FPGA with self-protecting ESD design for inter-die interfaces and its CDM specification," 2016 IEEE International Reliability Physics Symposium (IRPS) Year: 2016.*
(Continued)

*Primary Examiner* — Roderick Tolentino
(74) *Attorney, Agent, or Firm* — Keith D. Nowak; Danielle C. Sullivan; Carter Ledyard & Milburn LLP

(57) ABSTRACT

A system and method for enhancing security for a high security embedded system. The system on chip device including at least one central processing unit (CPU) component, input and output component blocks, an independent hard or soft core dedicated to the input and output blocks, and a built-in, on die interposer, wherein the interposer consists of a field programmable gate array (FPGA) fabric, the FPGA fabric surrounding the components of the system on chip. The method for includes separating system components using a FPGA fabric, redirecting or changing the appearance of system components unknown to other system components, separating system code from security and recovery code, and providing proactive security problem detection and resolutions.

19 Claims, 2 Drawing Sheets

(56) References Cited

U.S. PATENT DOCUMENTS

| | | | |
|---|---|---|---|
| 2006/0173670 A1* | 8/2006 | Engel | G06F 11/261 703/26 |
| 2009/0172392 A1* | 7/2009 | Cizas | G06F 21/76 713/156 |
| 2014/0053230 A1* | 2/2014 | Rodgers | G06F 21/74 726/1 |
| 2014/0085829 A1* | 3/2014 | Yamashita | H05K 1/0204 361/717 |
| 2014/0233732 A1* | 8/2014 | Buer | H04N 21/2543 380/200 |
| 2015/0244898 A1* | 8/2015 | Tanaka | H04N 1/00973 358/1.13 |
| 2016/0071616 A1* | 3/2016 | Jeong | G11C 29/025 714/719 |
| 2017/0133103 A1* | 5/2017 | Kwon | G11C 7/10 |
| 2017/0195173 A1* | 7/2017 | Izenberg | G06F 9/45558 |
| 2017/0200672 A1* | 7/2017 | Jayasena | H01L 24/00 |
| 2018/0107622 A1* | 4/2018 | Zhang | G06F 1/12 |

OTHER PUBLICATIONS

Nasiri et al., "Multiple Dice Working as One: CAD Flows and Routing Architectures for Silicon Interposer FPGAs," IEEE Transactions on Very Large Scale Integration (VLSI) Systems Year: 2016 | vol. 24, Issue: 5 |.*

Karp et al."Interposer FPGA with Self-Protecting ESD Design for Inter-Die Interfaces and its CDM Specification", 2016 IEEE International Reliability Physics Symposium (IRPS), pp. 1-6, 2016, IEEE, US.

Nasiri et al. "Multiple Dice Working as One: CAD Flows and Routing Architectures for Silicon Interposer FPGA's", IEEE Transactions on a Very Large Scale Integration (VLSI) Systems, 2016, vol. 24, Issue 5, pp. 1-14, IEEE, US.

* cited by examiner

INTEGRATED OUT-OF-BAND SECURITY FOR HIGH SECURITY EMBEDDED SYSTEMS

This application is a divisional of U.S. patent application Ser. No. 15/705,812 filed Sep. 15, 2017 entitled "INTEGRATED OUT-OF-BAND SECURITY FOR HIGH SECURITY EMBEDDED SYSTEMS" and claims priority to U.S. Provisional Patent Application No. 62/395,043 filed Sep. 15, 2016, entitled "SUREBREC-INTEGRATED, OUT-OF-BAND SECURITY FOR OPEN MISSION SYSTEMS," both of which are hereby incorporated by reference in their entirety.

The present invention relates to system security enhancements, more specifically an integrated system on chip (SoC) out of band security for high security embedded systems including open mission systems (OMS).

BACKGROUND

Many embedded systems security and reliability features are integrated in-band or handled by an external support mechanism with limited access. In-band methods usually include some sort of kernel-level program, or a separate real time task that offers binary encryption, checksums, digital signing or prevent tampering and debugging. While these mitigations are useful, they are usually fixed and reside with the functional code being monitored. This leads to a few problems, one being a lack of updates which enable responding to new threats. Additionally, responses are limited to a few options, such as preventing a binary from running or restoring a part of the system to a known-good state, only for it to be corrupted again. Disabling or tampering with the in-band monitor is another potential problem.

External subsystems benefit from being out-of-band. Hardware such as trusted platform modules (TPMs) or watchdogs, often provide reliable static protections like trusted boot services, cryptographic functions, or heartbeat detection. However, they offer minimal proactive problem detection and resolutions. If an issue is detected, either the system self-corrects using predefined methods, the system will not boot, or the system is restarted.

More complex systems have been created but are frequently limited by data throughput or processing capabilities, or they require some assumed trust of device not present on the SoC die. While these tradeoffs were sufficient ten years ago, they are outclassed today in the face of nation state actors.

Two problems from the outset of the current art are: 1) high levels of integration of today's modern processors, and 2) their closed IP nature. Processors are still not developer friendly and have many closed-source components. Software drivers are also an issue and are frequently provided as binary blobs, unless large licensing fees are paid.

High levels of integration are excellent from a cost and power consumption point of view, however cause problems when researchers attempt to observe interactions between components within the SoC. Furthermore, the security of SoCs is sometimes questioned due to the integrated baseband and management features typically included.

SUMMARY OF THE INVENTION

The present invention works around both of the problems discussed above by leveraging an open-source CPU architecture that includes design and firmware, from microcode through power-on-self-test (POST). (A standard processor that is wrapped can be used in lieu of an open source CPU architecture where the functionality of the standard processor is restricted, for example preventing communications between the main and baseband processors). The present invention takes the technology trends with a capabilities first paradigm and re-visualizes them as a security first paradigm. With most OMS implementations deployed in embedded systems with a strong focus on security at design time, integration with an architecture like the present invention is clearly beneficial, it is the next evolution of these technologies.

The present invention provides a system on chip device for a high security embedded system comprising at least one central processing unit (CPU) component, input and output component blocks, an independent hard or soft core dedicated to the input and output blocks, and a built-in, on die interposer, wherein the interposer consists of a field programmable gate array (FPGA) fabric, the FPGA fabric surrounding the components of the system on chip.

The present invention provides a method for enhancing security for a high security embedded system comprising separating system components using a FPGA fabric, redirecting or changing the appearance of system components unknown to other system components, separating system code from security and recovery code, and providing proactive security problem detection and resolutions. The term "appearance" as used herein means that the FPGA fabric can emulate or reproduce a first system component that is being accessed by a second system component without a second system component knowing that it is accessing an emulated component.

BRIEF DESCRIPTION OF THE DRAWINGS

Further objects, features and advantages of the invention will become apparent from the following detailed description taken in conjunction with the accompanying figures showing illustrative embodiments of the invention, in which.

DETAILED DESCRIPTION

Figure 2:
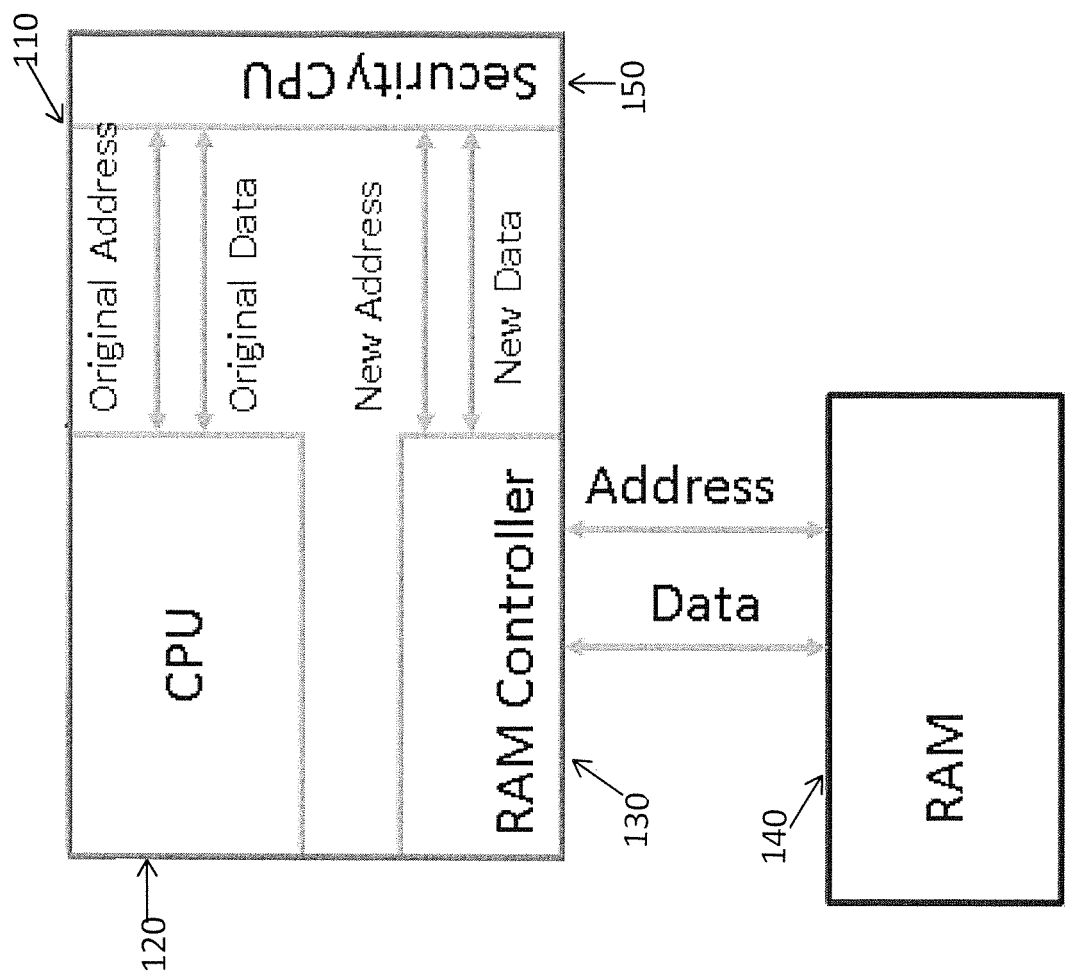
FIG. 2 shows a system on chip embodiment of the present invention.

Many embedded systems' security and reliability features are integrated in-band or are handled by external support mechanisms with limited access. In short, the trend is to modularize based on capabilities while tightly coupling the interfaces to maximize performance. Extra security/performance cores that are currently found in many smart phones for example, are typically smaller, less capable, but still tightly coupled to the other primary cores that do a majority of the work. The present invention solves this problem providing a System on Chip (SoC) designed and constructed around commercial off-the-shelf (COTS) host processors with a built-in, on-die, interposer and an independent hard or soft core dedicated to input/output (I/O) and security processing. Together, these can comprise the Security Central Processing Unit (SCPU).

The SoC of the present invention adds the capabilities currently being minimized by current SoC development, for example the SoC Xilinx Field Programmable Gate Array (FPGA) with a hardcore or the newer Intel processors using FPGA accelerators. Both the Xilinx and Intel provide speed improvements and are not designed for added security. Intel adds a FPGA fabric into processors for offloading select processing using accelerators as well as reconfigurable I/O. This boosts speed but does not change the security. Xilinx is continuing to add hard and soft core integration into the FPGA fabric. For speed, the Xilinx direct connects a lot of the peripheral interfaces bypassing the FPGA. Although the old Xilinx systems having either hard or soft core CPUs built into the fabric could be reconfigured using the present invention, the fabric used in the older systems is too slow. Both the Xilinx and Intel FPGAs have built in CPU (hard core) boards which allow the fabric to be programed directly or through the CPU (initiate the CPU and the CPU configures the fabric). In the present invention, the main CPU cannot see the fabric and therefore, the fabric must be programmed directly (loaded from either internal or external storage—a static configuration) or have another hard core (security CPU) program and potentially reprogram the fabric as needed.

The present invention focuses on a SoC with CPU/FGPA integration for performance and moving it towards security robustness. Instead of optimizing the coupling/connections of the modules, the fabric and external cores are used to separate and replicate the capabilities to focus on detecting and recovering from compromise. The security algorithms/computations of the present invention can be programmed into the FPGA fabric solely, or a mixture of a connected hard core and the fabric. For simpler instantiations, all programmed security capabilities could be just in the FPGA fabric. The present invention requires the FPGA fabric but can be enhanced for certain security features with the addition of a security CPU. (A soft core is the FPGA fabric programmed to behave like a physical CPU and able to run firmware in its native format). Since the hard and soft cores are wrapped and managed in an "invisible to the cores manner," additional processing will be unknown to the main applications running. Not only does this separate the security from the performance requirements, but this also allows the security to be updated or even adaptive. The performance and security may even be independent of one another, therefore lowering the threat of insider threats from the main performance-oriented team. (For example, it could be offshore work or open sourced work teams for the main features, and internal highly trusted security development teams for the present invention.). Another benefit of the present invention includes moving encryption engines and key stores into fabric out of band of the processor since the code running on the CPU is one of the most likely avenues to be attacked on the system.

The framework of the present invention includes hardware and software. The SoC is designed with a built-in, on-die, interposer and an independent hard or soft core dedicated to I/O and security processing. The interposer consists of reconfigurable and fully programmable FPGA fabric surrounding the components of the SoC. Unlike other implementations that contain FPGA elements on-die that can communicate with memory and on-board processors in a limited way, the present invention requires communications between SoC blocks that traverse the fabric without a way for the blocks to manipulate it. This provides out-of-band security, reliability and complex watchdog functionality, but with the speed and utility of in band access to the host CPU cores and peripherals. This also provides options to modify system data and the fabric itself on the fly. For example, the SCPU could passively monitor traffic between blocks, or actively manipulate data.

The SoC of the present invention is different than current SoCs with FPGA fabric in that data into and out of the host COTS central processing unit (CPU) and I/O blocks must traverse the on-die, out of band fabric that is the interposer. With this configuration, the SoC is able to provide monitoring or manipulation of data on-the-fly at modern speeds. This also allows the fabric to be reconfigured as needed for the application at hand, but only by the SCPU, completely independent of the host processors. The present invention may also integrate with other intellectual property to assist in machine learning, cross-domain data transfer, or active attack detection and response at the lower levels of the architecture.

In short, in the present invention the FPGA directly sits between CPUs and accelerator modules to separate the components with a "god-mode" security system. Is has full access to all of the "traditional components" and can reroute, encrypt, duplicate components, repurpose, restart, and has the ability to act as a "super watch-dog" without the traditional heartbeat from main functionality of a traditional watch-dog processor. The present invention differs in that it is invisible to the main functionality, it can be changed or updated without changing the main functionality, and it does not trust the main functionality unless it has verified the functionality (for example attestation, comparing the results of duplicate systems, etc.).

Figure 1:
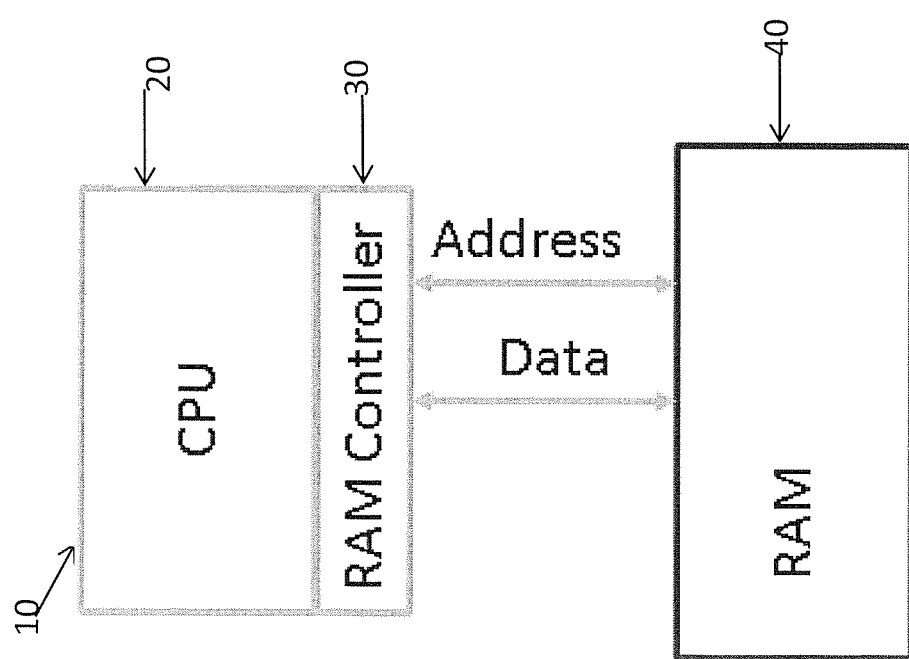
FIG. 1 shows a traditional system on chip architecture.

FIG. 1 shows a traditional SoC architecture. System on Chip 10 includes a central processing unit 20 coupled with memory block controller 30 which is connected to memory block 40.

FIG. 2 shows a simplified configuration of the present invention. The SoC 110 includes a hard-core central processing unit 120, a memory block controller 130, a memory block 140 and a security central processing unit 150. In this embodiment FPGA is added to SoC 110 in order to separate CPU 120 from memory controller 130 and a computational space is added either as just programmed fabric or fabric with a soft/hard core added CPU to incorporate the capabilities of the present invention. These capabilities include reconfiguring, repartitioning and changing what would have been seen by a traditional system 10. Additional CPU 150 (security CPU) allows the CPU 150 to run just security code.

In the traditional SoC system the CPU 20 has direct access to RAM controller 30. In contrast, the present invention uses FPGA fabric to separate CPU 120 from RAM controller 130 and provides the ability to redirect or change the appears of RAM controller 130 to CPU 120, unknown to CPU 120. This allows replicating RAM 130 with a slight delay. If an exploit from a remote transaction, like a buffer overflow, is detected in the present invention for example, the compromised section of memory can be discarded and swapped out with a backup. The CPU is not aware of what happened and continues running its program. In a watch-dog system of the prior art, the system would restart at the knowledge of a compromised section of memory and bring the system back to a clean state, halting the program the CPU is running.

Figure 3:
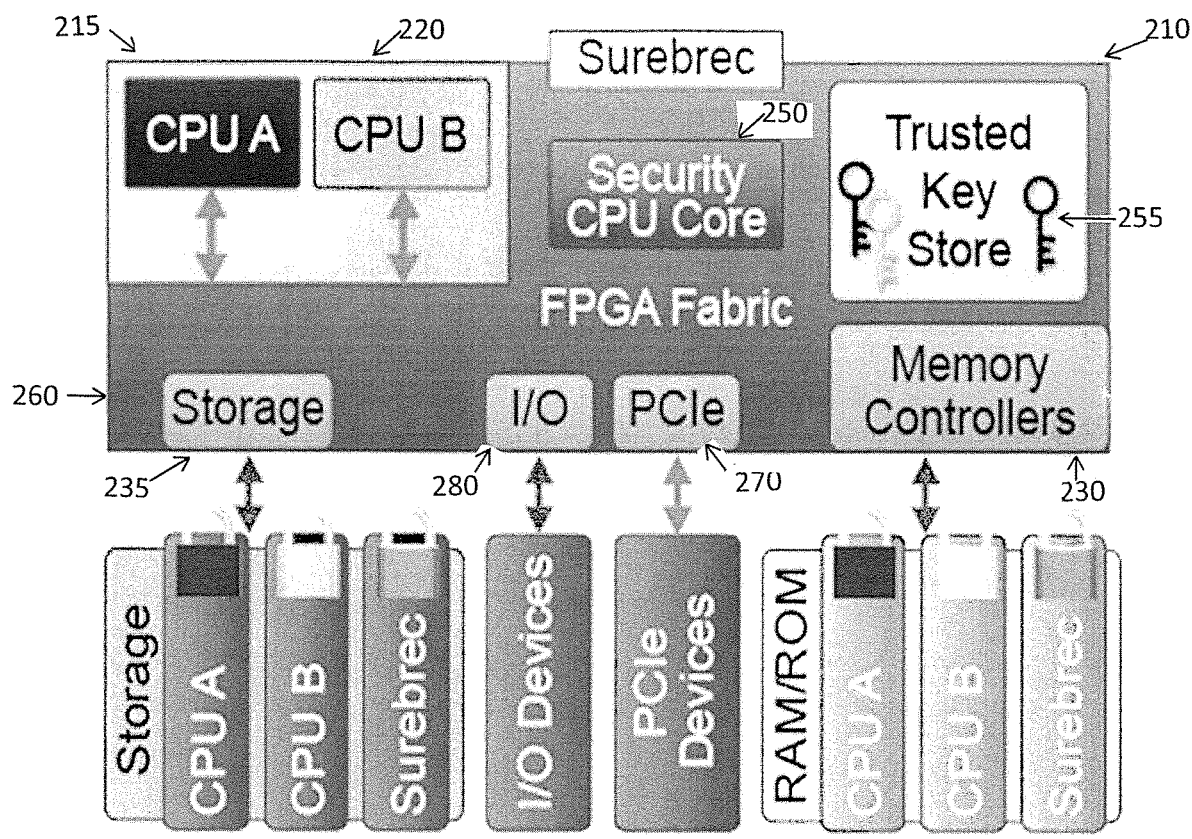
FIG. 3 shows another embodiment of the present invention.

FIG. 3 shows another embodiment of the present invention. SoC 210 includes central processing unit A 215, central processing unit B 220, security code CPU 250, trusted key store 255, memory controllers 230, peripheral component interconnect 270, I/O 280 and storage 235. FPGA fabric 260 separates each of these components. This framework separates CPUs 215, 220 (hard and soft cores) and accelerator/capability modules 225, 230, 235, 270, 280 (encryption engine, memory controller, storage controllers, peripherals and I/O, for example). For example, CPU A 215 and CPU B 220 are running 2 programs at two different classification levels and are typically not allowed to see each other due to compartmentalization of classified systems. However, without the present invention, there could be leakage. In order to prevent leakage, the two classified systems must be separate. The present invention not only separates their access to memory (even if they are on the same memory chip) but can also encrypt each with different keys. This is beneficial when the system is attacked with a memory interposer between the main processor and an external RAM. As far as the programs running (and the original development teams of the programs), the components are single standalone systems with individual memory that it believes it is managing. Adding security into the original programs is possible, however changing and updating the security requires updating the main functionality.

In another example, if CPU A needs data from CPU B which is a lower classification level, an external method of sending data one way would need to be used since the code on the two CPU systems is considered as different systems. The present invention redirects this data and the external method of transference has now become an internal method that is unable to be externally monitored. However, the code and code developers, would treat the CPUs as separate systems passing/receiving data over an external one-way interface.

Much like Open Mission Systems (OMS), the present invention has significant interest in the implementation and verification of cyber security measures in an open and adaptable framework. The architecture provides the means to test revolutionary security paradigms and provides a benchmark for securing OMS implementations. The present invention delivers a solid foundation on which OMS protections are developed and deployed for in many areas including: monitoring services executing on open computing environments (OCEs); securing gateways and bridges; facilitating cross-domain information traversal and gathering system metrics.

In the world of open system architecture, the present invention provides a method for integrating a legacy system with newer open systems. It also provides a means to add in reconfigurable security features without having to change the specification of each of the connected open systems. It can also be used to upgrade legacy systems where the original code has either been lost, or is too fragile to modify, as the present invention presents the appearance of the original hardware system to legacy code, while actually using newer incompatible hardware.

The flexibility of the present invention provides many benefits including the separate system and code from security and recovery code, a framework for protection research, firewalls, core acting as an independent system and on-chip processor mirroring. Having a separate system code from security and recovery codes allows out of band fixes to maintain integrity and availability. Providing a framework for protection research allows the development of a hardware immune system, learning how I/O and system misbehavior can be linked to allow response. "Firewalls" are added between the SoC blocks or components monitoring, filtering or encrypting I/O traffic independent of the systems primary tasks. Each core acting as an independent system, permits the SCPU to re-allocate resources and sub-systems, as needed. The SCPU may also assist with cross domain data transfers. On-chip processor mirroring allows identical functionality to run in parallel and swap between implementations to mitigate or correlate application or service misbehavior. Another benefit of the present invention includes the fact that security can be completely independent of the main system functionality therefore allowing the security to be updated, adapted and understood by only a trusted few.

The design of the present invention provides a processor on which novel attack detection, mitigation and proactive security for general computing is implemented. It has a new SoC layout that shares some capability with other commercial off the shelf options but is superior in a variety of ways. For example, the present invention differs from the prior art including the following ways: regarding, Joint Test Action Group (JTAG)/background Debug mode (BDM) ports, these interfaces have external control over many aspects of a system, but generally must pause execution to obtain system states and manipulate data interfaces; in combined FPGAs and ARM processors such as the Xilinx Zynq series, the architecture does not allow the fabric to directly sit between the CPUs and memory; unlike all External interposers all of the functionality is on board; and in watchdog systems, which are limited in access and responses to bad behavior due to their removed nature, they are limited in detecting problems, determining causes and executing responses. The present invention overcomes these difficulties.

Intel based computers prior to 2010 typically had a main processor, a north bridge that managed things like the central processing unit access to memory, and a south bridge that managed peripheral access through the north bridge for access by the CPU. The present invention replaces the north bridge and allows multiple CPUs to be added and managed, while at the same time all users/programmers would believe the desktop box is holding multiple independent computers. A security team could program the present invention "north bridge" to add in security features such as monitoring users, encrypting all data, and restricting and redirecting access to external websites. This allows parts of the CPU to be segmented and audit all low-level code as needed.

The may sound similar to modern server/firewalls, however, unlike firewalls, the present invention cannot be hacked. The concept of firewalls is well known and can be implemented in many ways. Most firewalls are implemented either internally (well integrated and visible) or externally (for example a network firewall which is invisible but not well integrated). The present invention would not be visible internally or externally. Since it cannot be seen, in contrast to firewalls, it cannot be hacked (if implemented correctly). Another example. Intel's AMT is a tightly integrated external interface. The AMT is susceptible to being hacked because it is too tightly integrated to the system and therefore too visible. The present invention may be used in military or high security systems, for example.

Although the present invention has been described in conjunction with specific embodiments, those of ordinary skill in the art will appreciate the modifications and variations that can be made without departing from the scope and the spirit of the present invention.

The invention claimed is:
1. A method for enhancing security for a high security embedded system comprising:
 separating and surrounding each system component of a system on chip using a FPGA fabric on a built-in, on die interposer on the system on chip,
 redirecting or optionally changing the appearance of the system components without notifying the other system components,
 separating system code from security and recovery code; and
 reconfiguring the FPGA fabric as needed using a security central processing unit (SCPU) by an application run- ning on at least one application central processing unit (ACPU) but completely independent of the at least one ACPU.

2. The method as recited in claim 1 wherein functionality of the security of the system can be changed or updated without changing functionality of the system.

3. The method as recited in claim 1 further comprising modifying data and the FPGA fabric on the fly.

4. The method as recited in claim 1 wherein the FPGA must verify the functionality of the at least one ACPU in order to function.

5. The method as recited in claim 1 wherein the system components include the at least one application central processing unit (ACPU), a trusted key store, a memory block component, a memory block controller component, the built in, on die interposer and the security central processing unit (SCPU).

6. The method as recited in claim 5 wherein the FPGA separates the at least one ACPU from the memory block controller.

7. The method as recited in claim 5 wherein the appearance of the memory block controller to the at least one ACPU changes appearance without notifying the at least one ACPU.

8. The method as recited in claim 5 further comprising encrypting the at least one ACPU with different keys from the trusted key store.

9. The method as recited in claim 1 wherein all data into and out of the system components must traverse the FPGA fabric.

10. The method as recited in claim 1 further comprising updating or changing the FPGA fabric without interruption of an application running on the system components.

11. The method as recited in claim 1 wherein the FPGA fabric has full access to some of the system components but is invisible to other system components.

12. The method as recited in claim 5 wherein the at least one ACPU includes a first ACPU and a second ACPU, the first ACPU and the second ACPU running two programs at two different classification levels.

13. The method as recited in claim 1 wherein the FPGA can reroute, encrypt, emulate, repurpose and restart the system without reference to or support from the at least one ACPU running the system.

14. The method as recited in claim 5 wherein the FPGA fabric has full access to the memory block component and the memory block controller component but is invisible to the at least one ACPU.

15. The method as recited in claim 12 wherein the FPGA fabric separates a first ACPU and a second ACPU from access to the memory block component.

16. The method as recited in claim 1 further comprising programming security algorithms and computations solely in the FPGA fabric.

17. The method as recited in claim 1 further comprising moving encryption engines and key stores into fabric out of band of the at least on ACPU.

18. The method as recited in claim 12 further comprising separating the first ACPUs and the second ACPUs access to memory and encrypting the first ACPU and the second ACPU with different keys.

19. The method as recited in claim 12 further comprising redirecting data from the second ACPU to the first ACPU internally on the system on chip, wherein the first ACPU has a higher classification level.

* * * * *